(12) United States Patent
Suzuki et al.

(10) Patent No.: US 6,737,782 B2
(45) Date of Patent: May 18, 2004

(54) ELECTRIC ROTARY MACHINE HAVING BOBBINS WITH THIN-WALLED EXTENSIONS OF FLANGE

(75) Inventors: Yuzuru Suzuki, Shizuoka-ken (JP); Seiichi Matsuura, Shizuoka-ken (JP); Masato Hata, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/370,966

(22) Filed: Feb. 20, 2003

(65) Prior Publication Data

US 2003/0160532 A1 Aug. 28, 2003

(30) Foreign Application Priority Data

Feb. 25, 2002 (JP) ........................................ 2002/048047

(51) Int. Cl.[7] .............................................. H02K 15/04
(52) U.S. Cl. ........................................ 310/194; 310/218
(58) Field of Search ................................. 310/218, 194, 310/43, 45

(56) References Cited

U.S. PATENT DOCUMENTS 3,339,097 A * 8/1967 Dunn .......................... 310/194
4,818,911 A * 4/1989 Taguchi et al. ............. 310/259
5,698,923 A * 12/1997 Scherzinger et al. ........ 310/194

FOREIGN PATENT DOCUMENTS

JP        2001-238377         8/2001 .................. 310/194

* cited by examiner

Primary Examiner—Tran Nguyen
(74) Attorney, Agent, or Firm—Fay, Sharpe, Fagan, Minnich & McKee, LLP

(57) ABSTRACT

An electric rotary machine includes a stator comprising: a stator ring; a plurality of discrete salient poles each comprising a pole tooth, disposed inside the stator ring thereby forming a magnetic circuit, and fixed by a molding resin injected inside the stator ring; and a plurality of bobbins each constituting the salient pole, adapted to lodge the pole tooth fitted thereinto and to have a magnet wire wound thereon, and each including its outward-positioned flange having at its respective both ends two flexible thin-walled extensions which are adapted to securely hold the wound magnet wire in place, stay unbent during winding operation, and which are bent when the salient poles are put inside the stator ring.

5 Claims, 8 Drawing Sheets

ELECTRIC ROTARY MACHINE HAVING BOBBINS WITH THIN-WALLED EXTENSIONS OF FLANGE

BACKGROUND OF THE INVENTION

1. Field of the Invention

The present invention relates to an electric rotary machine (hereinafter referred to as "rotary machine," or occasionally "motor" as appropriate), and more particularly to a radial gap type rotary machine comprising an armature with discrete salient poles.

2. Description of the Related Art

In a conventional rotary machine including a stator armature structured such that a plurality of ring-shaped yoke pieces, which are made of a soft magnetic plate, such as a silicon steel plate, and which each have a plurality of pole tooth portions protruding radially, are stacked in the axial direction, since each of the ring-shaped yoke pieces is punched out integrally with the plurality of pole tooth portions as a single piece (the armature composed of the ring-shaped yoke pieces thus structured is hereinafter referred to as "integral armature" as appropriate), pole teeth each composed of a stack number of pole tooth portions are not partitioned structurally and therefore a resultant armature will have superior magnetic efficiency (low reluctance). However, in a small rotary machine, since a wire is usually wound directly on each of the pole teeth, the integral armature makes the winding operation troublesome, and extremely troublesome when the rotary machine is of inner rotor type. As a result, the winding operation takes a long time, and the winding incurs unsatisfactory space factor as well. And, due to the flyer-winding involved in this case, the wire is subject to torsional stress during the winding operation, thereby failing to ensure reliability of the winding area.

Under the circumstances above described, a rare earth magnet having high energy product has been developed recently, and the structure of a rotary machine can be reviewed by means of magnetic circuit analysis using a computer. This works to enable a rotary machine with an armature of discrete salient pole structure (this armature is hereinafter referred to as "discrete armature" as appropriate) to obtain requisite motor characteristics. The rotary machine with the discrete armature may give some undesired increase in reluctance but offers great advantages of easier winding operation and increased space factor of winding so as to override the disadvantageous increase in reluctance. From this, it is now realized that the rotary machine with the discrete armature produces higher performance and is manufactured less expensively on the whole, and there is a growing demand for the discrete armature.

One example of the discrete armature is manufactured such that pole tooth portions are dismembered off its main body portion of an integral armature, a wire is wound around each of the dismembered pole tooth portions thereby constituting each salient pole portion, and that the pole tooth portions each with a wire wound therearound, namely, the salient pole portions are rejoined to the main body portion by laser-welding, or the like.

The armature thus structured, however, has a disadvantage that the integral armature has to be first sectioned and later reassembled, thereby requiring an additional time. Also, when the pole tooth portions each with a winding (salient poles) are rejoined to the main body portion, the stack layers of the both portions have to be matched with each other, and therefore it is required that respective portions be held together by a well-maintained tool and surely welded plate by plate for ensuring precision, which results in decreased workability. And, joints (welded portions) deteriorate significantly in mechanical strength and magnetic characteristics.

To overcome the above described problems, the present inventors disclosed in Japanese Patent Application Laid-open No. 2001-238377 a radial gap type rotary machine including a stator which comprises: a discrete armature including a plurality of discrete salient poles, and a cylindrical pole tooth ring for connecting the salient poles to one another magnetically and mechanically; and a cylindrical stator ring adapted to decrease leakage flux resulting from magnetic discontinuity.

Figure 10:
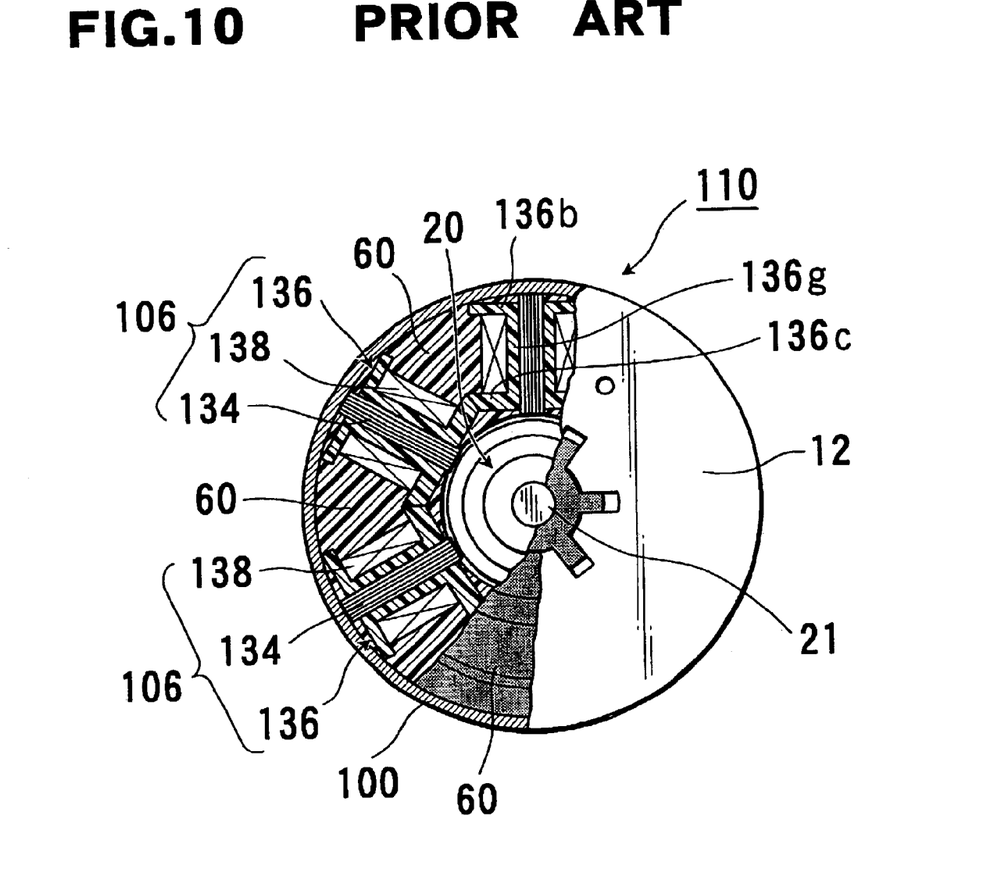
FIG. 10 is a schematic view of a conventional rotary machine, partially showing its radial section.

FIG. 10 is a partial cross-sectional view of a conventional rotary machine with a discrete armature viewed from the axial direction. Illustrated in FIG. 10 are: salient poles 106, an armature assembly 110, a flange 12, a rotor assembly 20, a shaft 21, pole teeth 134, bobbins 136, bobbin flanges 136b and 136c, coil winding portions 136g, magnetic wires 138, a molding resin 60, and a stator ring 100. The rotary machine disclosed in the above mentioned Japanese Patent Application Laid-open No. 2001-238377 has a pole tooth ring for positioning and fixing salient poles, but the pole tooth ring is not essential for the prevent invention and is omitted in FIG. 10 for ease of understanding. However, it is noted that the present invention can be applied to a rotary machine having the pole tooth ring.

As shown in FIG. 10, in the conventional rotary machine with a discrete armature, the bobbin 136, which holds a pole tooth comprising a plurality of thin steel plates stacked, has its flanges 136b and 136c respectively on its both ends sandwiching the coil winding portion 136g. The bobbin flanges 136b and 136c are dimensioned to be larger than the coil winding thickness so as to keep the magnet wire 138 braided in good shape. And, the molding resin 60 is injected between the salient poles 106, whereby the salient poles 106 and the magnet wires 138 are fixed securely. The above described rotary machine, however, has the following problems.

The circumferential dimension of the bobbin flange 136b positioned toward the stator ring 100 is usually determined according to the coil winding thickness. The magnet wire 138 receives a stress due to the expansion and contraction of the molding resin 60 injected between the salient poles 106, and may become unbraided at its outer turns when the bobbin flange 136b is conventionally dimensioned, which allows a part of the magnet wire 138 to get in direct contact with the stator ring 100 of a steel plate, possibly causing an insulation failure.

Also, the bobbin flange 136b has a dimensional problem, which will be described with reference to FIGS. 11A, 11B and 12.

Figure 11A:
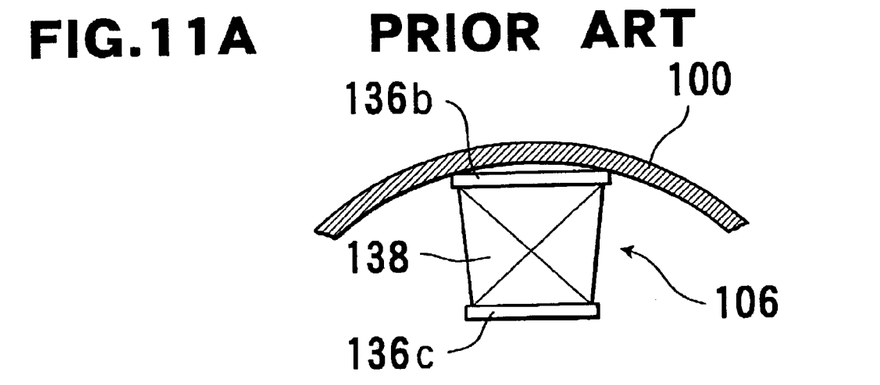
FIG. 11A is an explanatory sectional view of a problem of the conventional rotary machine, showing a salient pole comprising a bobbin with its stator ring-side flange having a dimension matched to a coil outside dimension.
Figure 11B:
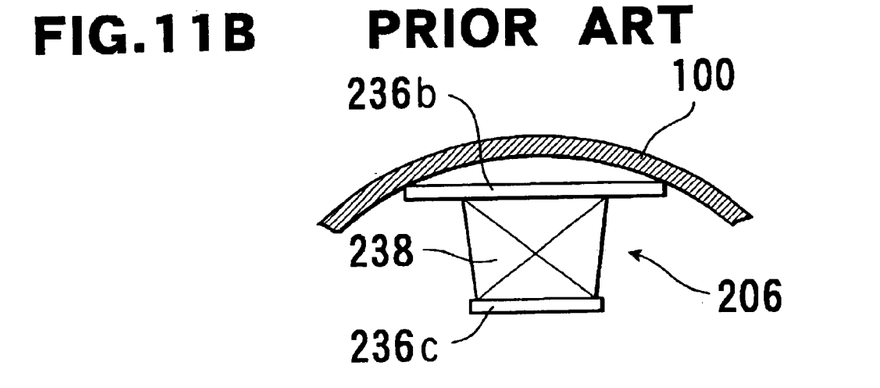
FIG. 11B is an explanatory sectional view of a problem of the conventional rotary machine, showing a salient-pole comprising a bobbin with its stator ring-side flange having a dimension larger than a coil outside dimension.

FIG. 11A is a cross-sectional view of a bobbin of the salient pole 106, in which the bobbin flange 136b positioned toward the stator ring 100 is dimensioned to the outside dimension of a coil, and FIG. 11B is a cross-sectional view of a bobbin of a salient pole 206, in which a bobbin flange 236b positioned toward the stator ring 100 is dimensioned to be larger than the outside dimension of a coil.

Referring to FIG. 11B, the bobbin flange 236b dimensioned to be larger than the outside dimension of a coil is forced to be located closer to another bobbin flange 236c due to the stator ring 100 arcing, thereby decreasing a winding space for a magnet wire 238. This means that, if a bobbin flange positioned toward the stator ring 100 is simply increased in dimension as shown in FIG. 11B for the purpose of preventing the coil from getting unbraided resulting in a magnet wire coming in contact with the stator ring 100, the winding space is decreased resulting in a reduced space factor, thereby failing to achieve desired motor characteristics. Seemingly, this problem can be solved by making the bobbin flange 236b configured, specifically, arced to the configuration of the inner circumferential surface of the stator ring 100, but this seeming solution still has the following problem.

Figure 12:
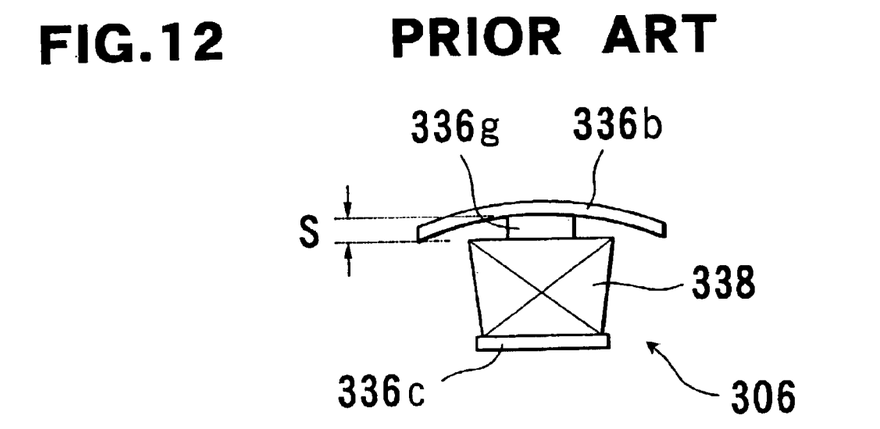
FIG. 12 is an explanatory view of a problem of the conventional rotary machine, showing a bobbin with its stator ring-side flange having a dimension larger than a coil outside dimension and configured to follow the inner circumference of the stator ring.

FIG. 12 is an explanatory view of the problem of the seeming solution. In FIG. 12, a salient pole 306 has a bobbin with a bobbin flange 336b located toward the stator ting 100 (not shown in FIG. 12). The bobbin flange 336b has an increased dimension, and is arced to follow the inner circumferential surface of the stator ring 100. With this configuration, a coil winding portion 336g defined by a space between the bobbin flange 336b and another bobbin flange 336c can be increased by the dimension S in the length direction. However, the inwardly-overhanging (downwardly in the figure) ends of the bobbin flange 336b stand in the way when a magnet wire 338 is wound on the bobbin, making the winding operation very difficult, and can touch the magnet wire 338 causing a trouble. Accordingly, the increased dimension S cannot be fully utilized due to the existence of the downwardly-overhanging ends of the bobbin flange 336b.

Further, the rotary machine shown in FIG. 10 is structured such that-the rotor assembly 20 is disposed at the center of the stator ring 100, and a plurality (six in the figure) of salient poles 106 are arrayed circumferentially between the stator ring 100 and the rotor assembly 20. This structure causes it that an open space, into which the molding resin 60 is poured, is larger toward the stator ring 100 than toward the rotor assembly 20. In this structure, the above described problem produces an additional open space proportionate to the decreased coil winding portion, which increases the amount of the molding resin 60 thereby pushing up the material cost and increasing the injecting time, especially in case of a large size rotary machine.

SUMMARY OF THE INVENTION

The present invention has been made in the light of the above problems, and it is an object of the invention to provide a rotary machine, in which a magnet wire is free from contact with a stator ring, the space factor of a coil is increased, and the amount of a molding resin to be injected inside the stator ring is decreased.

In order to achieve the object, according to a first aspect of the present invention, a rotary machine includes a stator comprising: a stator ring thereby forming a magnetic circuit; a plurality of salient poles each having a pole tooth, disposed inside the stator ring, and fixed by a molding resin injected inside the stator ring; and a plurality of bobbins each constituting the salient pole, adapted to lodge the pole tooth fitted thereinto and to have a magnet wire wound thereon, and each having its outward-positioned flange in contact with the stator ring, wherein the outward-positioned flange has two flexible thin-walled extensions at its respective ends thereby securely holding the wound magnet wire in place.

According to a second aspect of the present invention, in the rotary machine of the first aspect, a resin compartment is formed at the end of one of the two thin-walled extensions.

According to a third aspect of the present invention, in the rotary machine of the second aspect, any part of the resin compartment is positioned behind the plane of the inner wall face of the bobbin flange before assembly.

According to a fourth aspect of the present invention, in the rotary machine of the second or third aspect, the resin compartment is hollow.

Accordingly, in the rotary machine of the present invention, the flexible thin-walled extensions, which are adapted to hold the magnet wire wound in place thereby preventing the magnet wire from making contact with the stator ring, stay unbent before assembly and are bent during assembly, whereby the winding operation is not hindered improving the production efficiency and also the coil winding portion can be successfully increased improving the space factor. And, the resin compartment works to reduce the open space in the stator ring to be filled by the molding resin, thereby decreasing the amount of the molding resin and reducing the time for injecting the molding resin.

BRIEF DESCRIPTION OF THE DRAWINGS

The above and other features and advantages of the present invention will become apparent from the following description which will be given with reference to the illustrative accompanying drawings, in which:

FIGS. 3A and 3B in combination constitute an exploded perspective view of a salient pole (omitting a magnet wire) of FIGS. 1 and 2, wherein FIG. 3A shows a bobbin and FIG. 3B shows a pole tooth;

FIGS. 5A and 5B in combination constitute an exploded perspective view of an armature assembly of FIG. 1, wherein FIG. 5A shows six salient poles arranged at an angle of 60 degrees with respective bobbin flanges in contact with one another, and FIG. 5B shows a stator ring;

DETAILED DESCRIPTION OF THE PREFERRED EMBODIMENTS

Preferred embodiments of the present invention will be described in detail with reference to the drawings.

Figure 1:
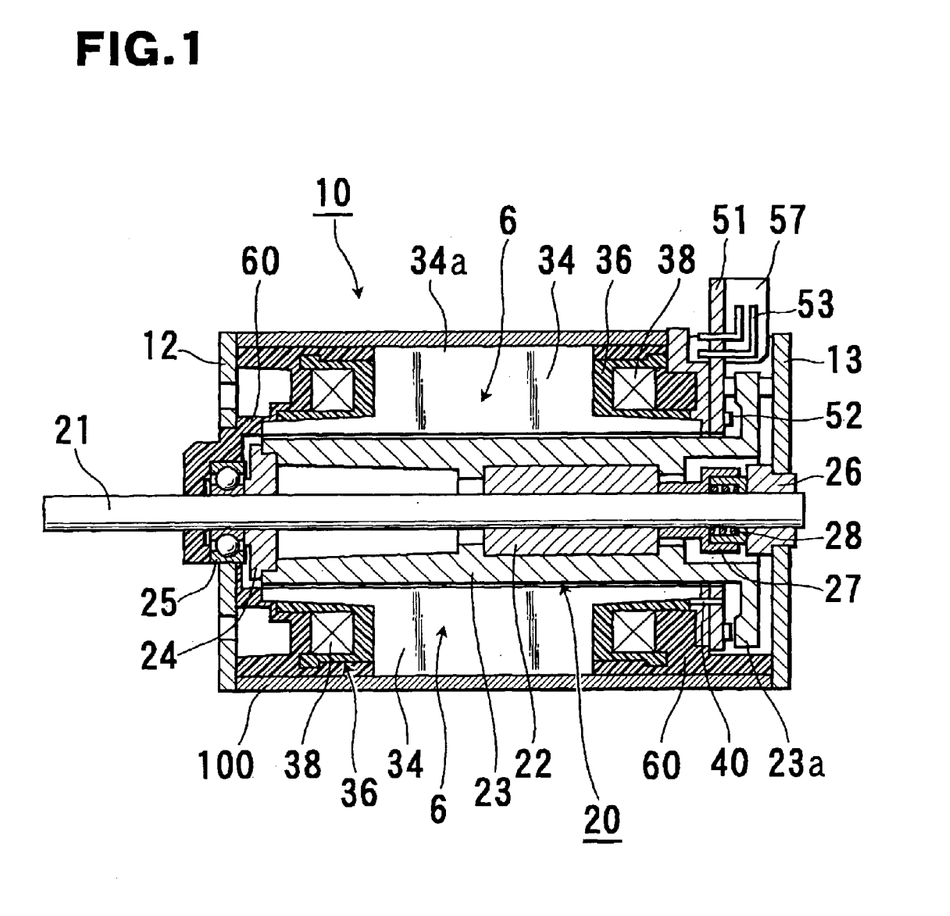
FIG. 1 is a schematic view of a rotary machine according to a first embodiment of the present invention, showing its axial section.
Figure 2:
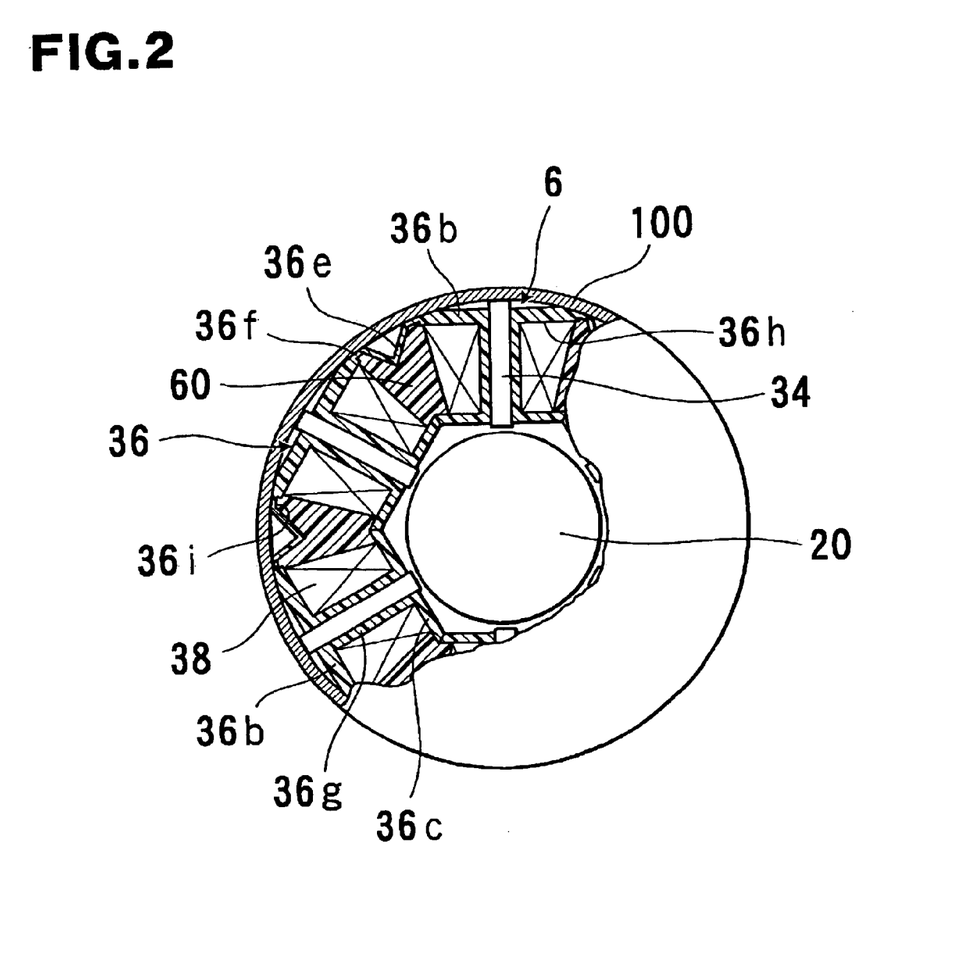
FIG. 2 is a schematic view of the rotary machine of FIG. 1, partially showing its radial section.

FIGS. 1 and 2 show a structure of a three-phase inner rotor type brushless DC motor with six salient poles and eight rotor magnetic poles, as an embodiment of the present invention, wherein illustrated are: salient poles 6, an armature assembly 10, flanges 12 and 13, a rotor assembly 20, a shaft 21, a sleeve 22, a rotor field magnet 23, a rotor position detecting magnet 23a, a spacer 24, a ball bearing 25, a sleeve bearing 26, a preload spring holder 27, a preload spring 28, pole teeth 34, pole tooth end portions 34a, bobbins 36, bobbin flanges 36b and 36c, coil winding portions 36g, resin compartments 36e, bobbin flange thin-walled extensions 36f and 36i having flexibility, magnet wires 38, terminal pins 40, a printed circuit board 51, a Hall sensor 52, connector terminals 53, a connector 57, a molding resin 60, and a cylindrical stator ring 100.

The embodiment here refers to a so-called integrally resin-molded armature assembly structured such that a resin is filled inside an armature assembly except a portion where a rotor field magnet is received.

The brushless DC motor generally comprises: the armature assembly 10; the two flanges 12 and 13 arranged respectively at both axial ends of the armature assembly 10; and the rotor assembly 20 rotatably disposed inside the armature assembly 10.

The armature assembly 10 includes: the stator ring 100 as its outer circumference; and six of the salient poles 6 each extending radially, and arrayed circumferentially at an even angular interval of 60 degrees.

Figures 3A, 3B:
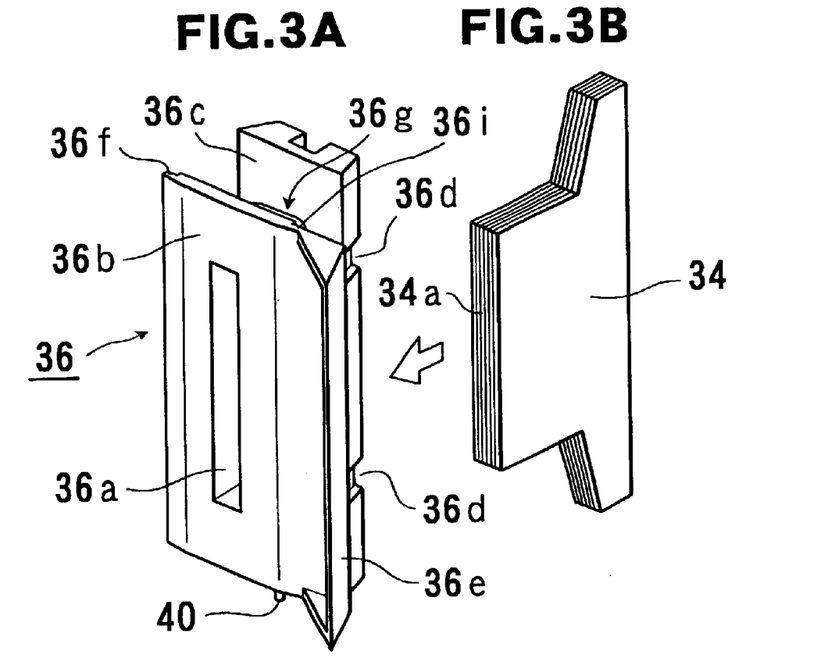
Figure 4:
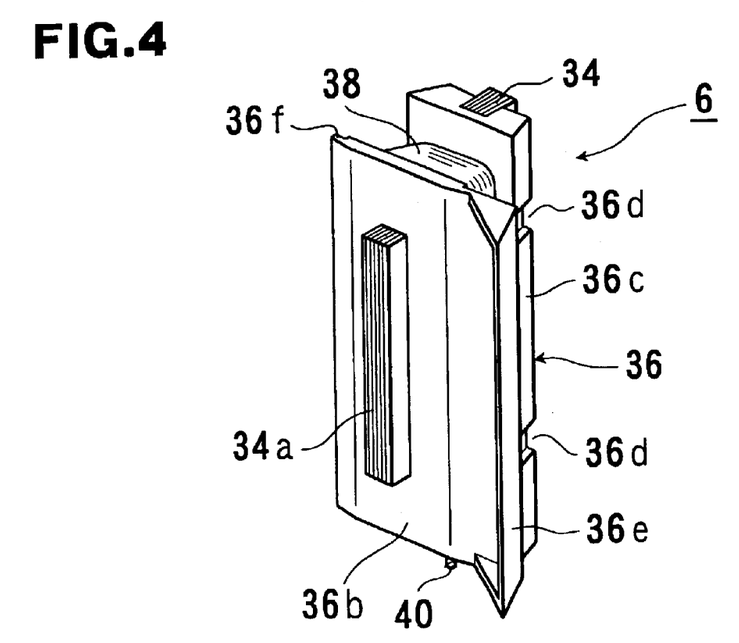
FIG. 4 is a perspective view of the salient pole (including the magnet wire) of FIGS. 1 and 2.

The salient poles 6 will be described below with reference to FIGS. 3A, 3B and 4. In FIGS. 3A, 3B and 4, the constituting parts same as or corresponding to those shown in FIGS. 1 and 2 have the same reference numbers.

The salient poles 6 are each structured such that the pole tooth 34 (FIG. 3B) composed of seven surface-insulated magnetic steel plates stacked on one another, each plate having a thickness of 0.5 mm and punched out to be substantially T-shaped, has its T-letter's vertical (oriented horizontal in the figure) bar portion inserted into a rectangular hole 36a of the bobbin 36 (FIG. 3A) and such that the wire 38 is wound on the coil winding portion 36g defined between the bobbin flanges 36b and 36c as shown in FIG. 4. The terminations of the magnet wire 38 are bound around respective terminal pins 40 attached to the lower end of the bobbin flange 36c.

The pole tooth 34 is dimensioned so as to protrude by a predetermined dimension overall from the surface of the bobbin flange 36b when fitted into the hole 36a of the bobbin 36.

The pole tooth 34 may alternatively be made of a soft magnetic material such as a ceramic molding formed by sintering a soft magnetic powder, and a metallurgic molding formed by sintering a soft magnetic material composed of micro-powder of surface-insulated pure iron. The pole tooth 34 made of a different soft magnetic steel material containing Fe—Ni—Cr series steel not only keeps a high permeability but also has a relatively high electrical resistance thereby reducing its eddy current loss, and at the same time is free from corrosion without rustproof treatment thus being suitable for use in extreme environments such as automotive application.

The bobbin flange 36c has, on each of its both sides, two notches 36d, 36d forming resin injection holes for injecting the molding resin 48 through.

The bobbin flange 36b has a thin-walled extension 36f at one end thereof, and a thin-walled extension 36i and a resin compartment 36e at the other end. The thin-walled extensions 36f and 36i, and the resin compartment 36e may be formed of the same material as the other portions of the bobbin 36, for example, resin. Thus, the bobbin flange 36b of the present invention has its width increased for the dimensions of the thin-walled extensions 36f and 36i, and the resin compartment 36e, whereby the magnet wire 38 wound is prevented from becoming unbraided to get in contact with the stator ring 100 while assembling the rotary machine. Also, since the bobbin flange 36b including the thin-walled extensions 36f and 36i, and the resin compartment 36e, unlike the bobbin flange 336b shown in FIG. 12, is not arced toward the other bobbin flange 36c, the winding operation is not hindered.

Figure 5A:
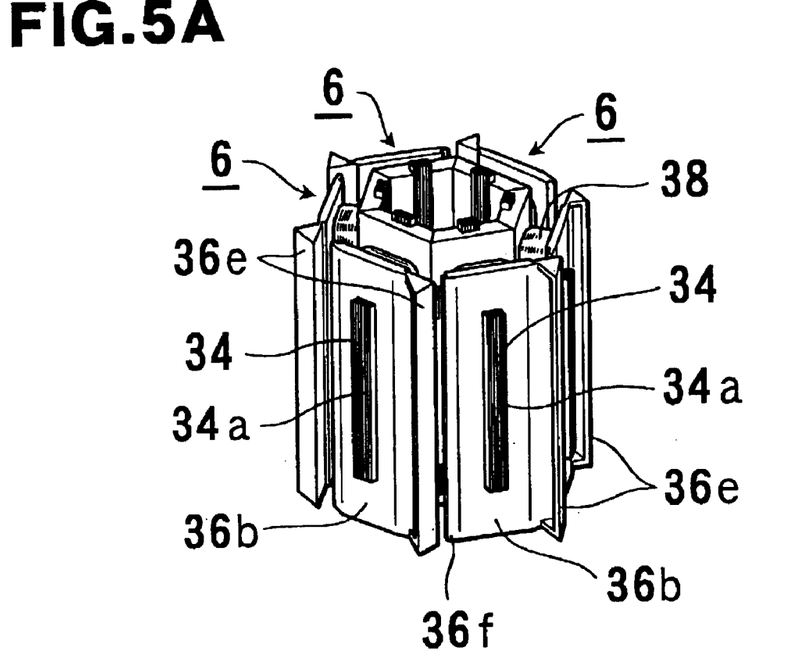
Figure 5B:
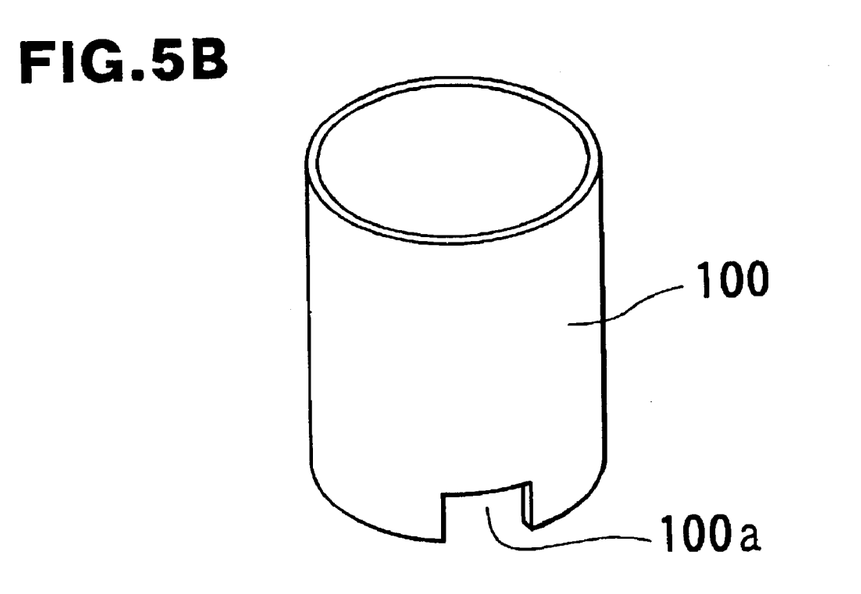

The structure of the armature assembly 10 will be described below with reference to FIGS. 5A and 5B, which in combination constitute an exploded view of the armature assembly 10 shown in FIG. 1. In FIGS. 5A and 5B, any component parts corresponding to those in FIGS. 1 to 4 are denoted by the same reference numerals, and a detailed description thereof will be omitted.

The stator ring 100 shown in FIG. 5B is a hollow cylinder of soft magnetic steel and has a notch 100a for accommodating the connector 57 (see FIG. 1). In this embodiment, the stator ring 100 is put over the salient poles 6 shown in FIG. 5A, whereby a magnetic circuit is formed. In this embodiment, a pole tooth ring, which is used in a rotary machine disclosed in Japanese Patent Application Laid-open No. 2001-238377, is eliminated, but the present invention is not limited thereto but may be applied to the rotary machine using the pole tooth ring.

Figure 6A:
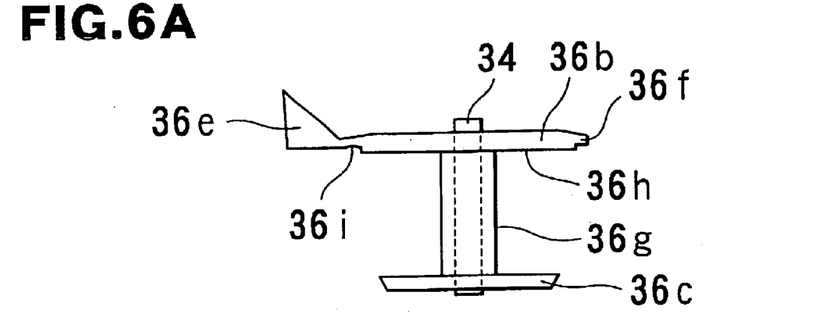
FIG. 6A is a plan view of the salient pole (omitting the magnet wire) of FIG. 4, showing how the pole tooth is set in the bobbin.
Figure 6B:
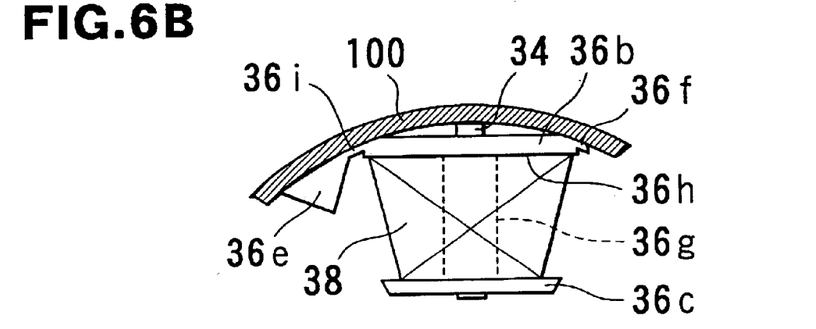
FIG. 6B is a plan view of the salient pole of FIG. 4 provided with the magnet wire and housed in the stator ring.

The configuration of the bobbin 36 will hereafter be described in detail. Referring to FIGS. 6A and 6B, the thin-walled extension 36i is formed between bobbin flange 36b and the resin compartment 36e, and is adapted to bend flexibly. Also, the thin-walled extension 36f is adapted to bend flexibly. When, the wire magnet 38 is wound on the coil winding extension 36g of the bobbin 36, the thin-walled extensions 36f and 36i stay unbent as shown in FIG. 6A thereby not hindering the winding operation, thus the magnet wire 38 can be fully wound all the way up to a flange inner face 36h of the bobbin flange 36b. And, when the salient poles 6 with the bobbin 36 with the magnet wire 38 wound thereon are put in the stator ring 100, the thin-walled extensions 36f and 36i bend flexibly as shown in FIG. 6B, whereby the salient poles 6 fit into the stator ring 100 efficiently without taking up an unnecessary space.

Figure 7:
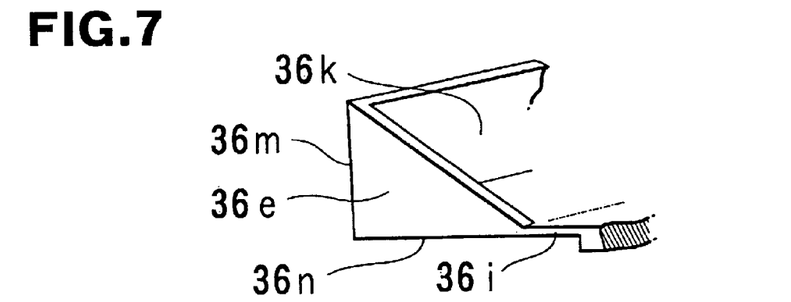
FIG. 7 is a perspective view of a dummy resin portion of FIG. 1.

The resin compartment 36e will be described with reference to FIG. 7. As shown in FIG. 7 as well as in FIGS. 4 and 6A, the bobbin flange 36b is provided integrally with the resin compartment 36e, which is a hollow-triangular prism having two closed end faces, one open flat (in section) side face 36k and two closed flat side faces 36m and 36n, and which extends from the very end of the thin-walled extension 36i such that the side face 36n is positioned behind the plane of the flange inner face 36h. In the rotary machine of the present invention, with the resin compartment 36e thus structured, the open space to be filled with the molding resin 60 is reduced for the volume of the prism compared to the conventional rotary machine shown in FIG. 1, thereby decreasing the amount of the molding resin 60 to be injected in the stator ring 100 thus reducing the material cost (resin cost), and reducing the time for injection resulting in improved production efficiency. Also, this enables a small inexpensive molding machine to be used.

Figure 8:
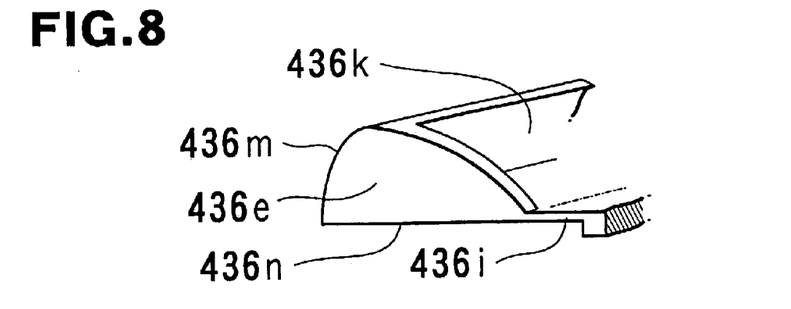
FIG. 8 is a perspective view of a resin compartment according to a second embodiment of the present invention.

In the first embodiment, the hollow-triangular prism as shown in FIG. 7 is used as the resin compartment 36e but the present invention is not limited thereto but the present invention may alternatively use, for example, a resin compartment 436e as shown in FIG. 8 showing a second embodiment.

Referring to FIG. 8, the resin compartment 436e is continuous with a bobbin flange via a thin-walled portion 436i, and is a hollow-semicircular prism having two closed end faces, one open arced (in section) side face 436k, one closed arced face 436m and one closed flat face 436n.

Figure 9A:
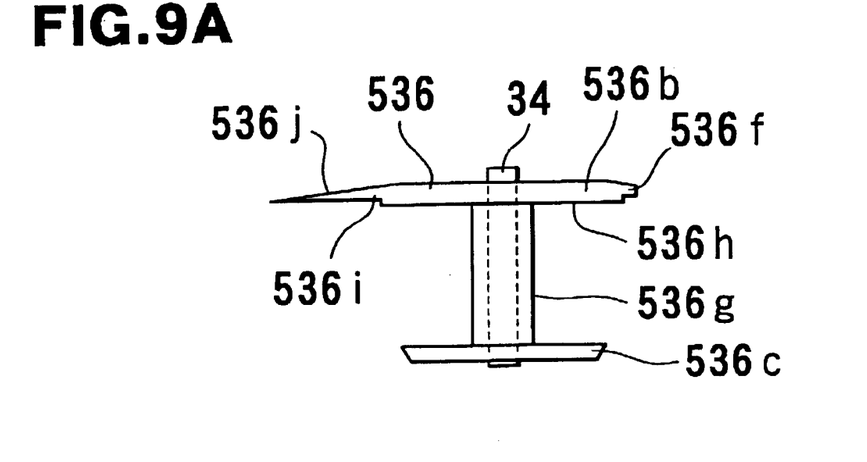
FIG. 9A is a plan view of a salient pole (omitting a magnet wire) according to a third embodiment, showing how a pole tooth is set in a bobbin.
Figure 9B:
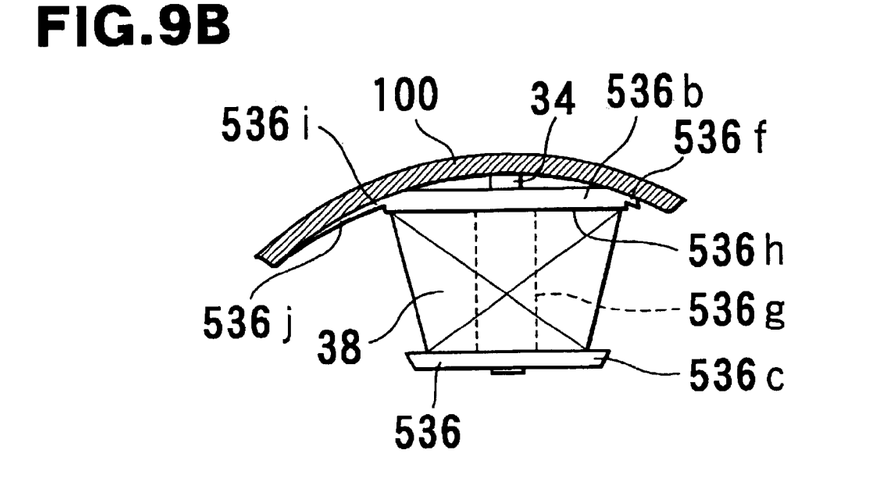
FIG. 9B is a plan view of the salient pole of FIG. 9A provided with the magnet wire, and housed in the stator ring.

A third embodiment will be described with reference of FIGS. 9A and 9B. FIGS. 9A and 9B show a bobbin 536, bobbin flanges 536b and 536c, a coil winding portion 536g, a flange inner face 536h of the bobbin flange 536b, thin-walled extensions 536f and 536i, and a resin compartment 536j.

As shown in FIGS. 9A and 9B, in the third embodiment, the resin compartment 536j is formed such that the thin-walled portion 536i is extended thereby preventing the magnet wire 38 (not shown in FIGS. 9A and 9B) from becoming unbraided, and keeping the magnet wire 38 free from contact with the stator ring. This resin compartment 536j has its inside face positioned flush with or behind the flange inner face 536f thereby not hindering the winding operation, and is flexibly bent at the thin-walled extension 536i when the salient pole assembly is housed in the stator ring thereby not taking up an unnecessary space unlike the bobbin flange 236b in the conventional rotary machine shown in FIG. 11B.

While the present invention has been illustrated and explained with respect to specific embodiments thereof, it is to be understood that the present invention is by no means limited thereto but encompasses all changes and modifications which will become possible within the scope of the appended claims.

What is claimed is:

1. An electric rotary machine, having a stator comprises:
    a stator ring;
    a plurality of discrete salient poles each comprising a pole tooth, disposed inside the stator ring thereby forming a magnetic circuit, and fixed by a molding resin injected inside the stator ring; and
    a plurality of bobbins, each of said bobbins constituting as part of the salient pole for lodging the pole tooth fitted into said bobbin have a magnet wire wound thereon, and each having its outward-positioned flange in contact with the stator ring, the flange of the bobbin having two flexible thin-walled extensions at its respective ends thereby securely holding the wound magnet wire in place.

2. An electric rotary machine according to claim 1, wherein a resin compartment is formed at an end of one of the two thin-walled extensions.

3. An electric rotary machine according to claim 2, wherein any part of the resin compartment is positioned behind a plane of an inner face of the bobbin flange before assembly.

4. An electric rotary machine according to claim 2, wherein the resin compartment is hollow.

5. An electric rotary machine according to claim 3, wherein the resin compartment is hollow.

* * * * *